(12) United States Patent
Kang

(10) Patent No.: US 8,477,240 B2
(45) Date of Patent: Jul. 2, 2013

(54) QUICK SHOE FOR CAMERA TRIPOD

(76) Inventor: Pil-sik Kang, Bucheon-si (KR)

( * ) Notice: Subject to any disclaimer, the term of this patent is extended or adjusted under 35 U.S.C. 154(b) by 247 days.

(21) Appl. No.: 13/125,863

(22) PCT Filed: Oct. 28, 2009

(86) PCT No.: PCT/KR2009/006271
§ 371 (c)(1),
(2), (4) Date: Apr. 25, 2011

(87) PCT Pub. No.: WO2010/050748
PCT Pub. Date: May 6, 2010

(65) Prior Publication Data
US 2011/0205426 A1 Aug. 25, 2011

(30) Foreign Application Priority Data

Oct. 30, 2008 (KR) .................. 10-2008-0107376

(51) Int. Cl.
*H04N 5/225* (2006.01)
(52) U.S. Cl.
USPC .......................................... 348/375; 348/373
(58) Field of Classification Search
USPC ...... 348/373–375; 248/178.1, 187.1; 396/428
See application file for complete search history.

(56) References Cited

U.S. PATENT DOCUMENTS

| 5,333,023 | A  | * | 7/1994 | Oxford ......................... 396/428 |
| 5,725,187 | A  | * | 3/1998 | Vo ............................... 248/178.1 |
| 6,196,504 | B1 | * | 3/2001 | Lemke ....................... 248/187.1 |
| 2008/0019687 | A1 | | 1/2008 | Kim |

FOREIGN PATENT DOCUMENTS

KR    10-2008-0042380 A    5/2008

* cited by examiner

*Primary Examiner* — Tuan Ho
(74) *Attorney, Agent, or Firm* — Jefferson IP Law, LLP

(57) ABSTRACT

Disclosed is a quick shoe used to mount a camera to a tripod. When the camera is directly coupled with the tripod, too much time is required. The camera is attached to the tripod in every use of 5 the camera. In order to solve this problem, the male quick shoe is permanently mounted on the lower end of the camera, and the female quick shoe is provided on a head of the tripod, such that the quick shoe is easily detached from the tripod through one touch scheme. This causes a problem that the male quick shoe is not firmly coupled 10 with the female quick shoe so that the camera shakes in shooting. The male quick shoe installed in the camera interferes with a user's hand in shooting, so that troubles occur in shooting. A vertical control grip is mounted on a body of the camera to obtain a vertical picture format.

3 Claims, 5 Drawing Sheets ical Field

The present invention relates to a quick shoe used to mount a camera on a tripod, and more particularly to a quick shoe for a camera tripod, capable of enhancing the securing force between a camera and a tripod and firmly securing the camera with the tripod to prevent the camera from being slightly shaken in shooting by forming inclined mount surfaces to be mounted on a female quick shoe of a head section of the tripod inside a male quick shoe fixed on a lower end of the camera.

BACKGROUND ART

In a conventional camera tripod, a mounting unit for a camera is integrated with a head section of the tripod, so that the camera is directly mounted on the tripod. The tripod is coupled with the camera through a fastening bolt provided in the camera mounting unit. In order to firmly mount the camera on the tripod, a user must always carry with a tool to fasten a bolt, and an additional unit must be provided to the fastening bolt of the head of the tripod to strongly mount the camera onto the tripod. In addition, since the camera must be mounted on the tripod by using a fastening nut whenever the camera is mounted on the tripod, long mounting time may be required. Accordingly, the camera cannot be quickly coupled with the tripod in urgent situation of capturing the moment, so that the camera has many limitations in use.

Recently, a male quick shoe is permanently mounted on the lower end of the camera, and a female quick shoe is mounted on the head of a tripod, so that the camera can be easily detachable from the tripod by using the male quick shoe through one touch scheme. However, when a camera takes a picture without being mounted on the tripod, the male quick shoe excessively protrudes downward, so that the grip feel of the camera may be degraded. In addition, the male quick shoe may continuously interfere with a user's hand, causing troubles in shooting.

In addition, a vertical control grip is mounted on the camera to extend the life span of a battery while facilitating photographing for a portrait picture. In this case, if the male quick shoe has been mounted on a lower end of the vertical control grip, when a user grips the lower end of the camera in order to obtain the portrait picture, the grip feel may be remarkably degraded. Accordingly, the vertical control grip aiming to improve the grip feel may not be effectively functioned.

The male quick shoe has a two-stage structure including a plate provided on a top surface thereof to mount the camera and a coupling section protruding from a lower end of the plate. The coupling section protruding from the lower end of the plate is secured with the female quick shoe of the head of the tripod to widen the interval between the camera and the tripod. Accordingly, the securing force between the camera and the tripod is degraded, so that the camera slightly moves in shooting. In this case, a picture shakes so that a bad influence is exerted on a photograph result.

Even if the camera is slightly shaken, this may become serious problem in terms of the photography characteristic in which shooting is performed in the unit of seconds. In particular, if the position of the camera mounted on the tripod is slightly changed when an object in a remote place is photographed, original framing intended by a photographer may not be achieved, so that serious influence is exerted on a photograph result.

To photograph a portrait picture, when the camera secured with the tripod is placed in a vertical direction, the shake degree of the camera becomes more serious, so that the camera may shake even if an environmental condition is slightly changed.

DISCLOSURE

Technical Problem

Accordingly, the present invention has been made to solve the above-mentioned problems occurring in the prior art. An object of the present invention is to provide a quick shoe for a tripod of a camera having a simple structure including male and female quick shoes to firmly secure a camera with a tripod, in which the thickness of the male quick shoe is minimized to enhance a grip feel, and the adhesion force between the camera and the tripod is increased to minimize the shake of the camera.

Technical Solution

In order to accomplish the object of the present invention, the male quick shoe has a structure in which a camera fixing unit is integrated with a unit of fixing a female quick shoe on a plate. A fastening unit used to fix the camera is formed at the central portion of the male quick shoe, and inclined mount surfaces to be secured with the female quick shoe are received inside the plate at both sides of the fastening unit. Outer surfaces of the plate in which the inclined mount surfaces are formed make contact with a top surface of the female quick shoe, thereby forming a double securing structure. Since the thickness of the male quick shoe includes only the thickness of the plate, the adhesion force between the camera and a tripod is enhanced, so that the shape of the camera can be minimized.

Advantageous Effects

As described above, according to the present invention, the plate has a simple structure and a thin thickness, so that the grip feel of the camera is increased even if the male quick shoe is mounted on the camera, and the securing force of the camera mounted on the tripod and the tripod is enhanced to prevent the shake of the camera, so that the photography condition can be improved.

BEST MODE

Figure 1:
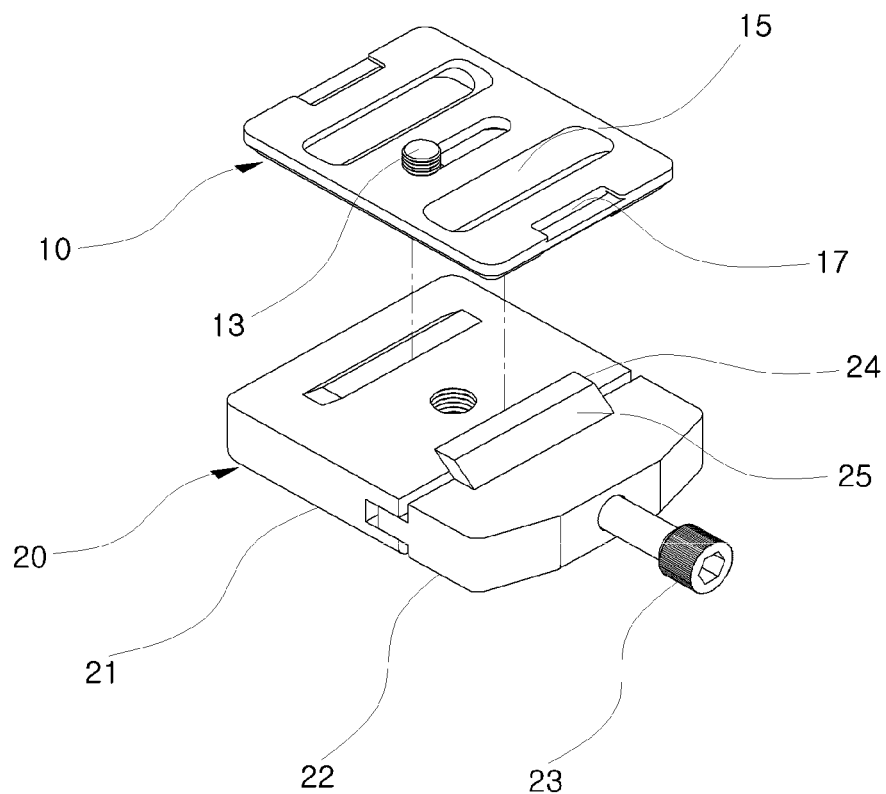
FIG. 1 is a perspective view showing one embodiment of the present invention.
Figure 2:
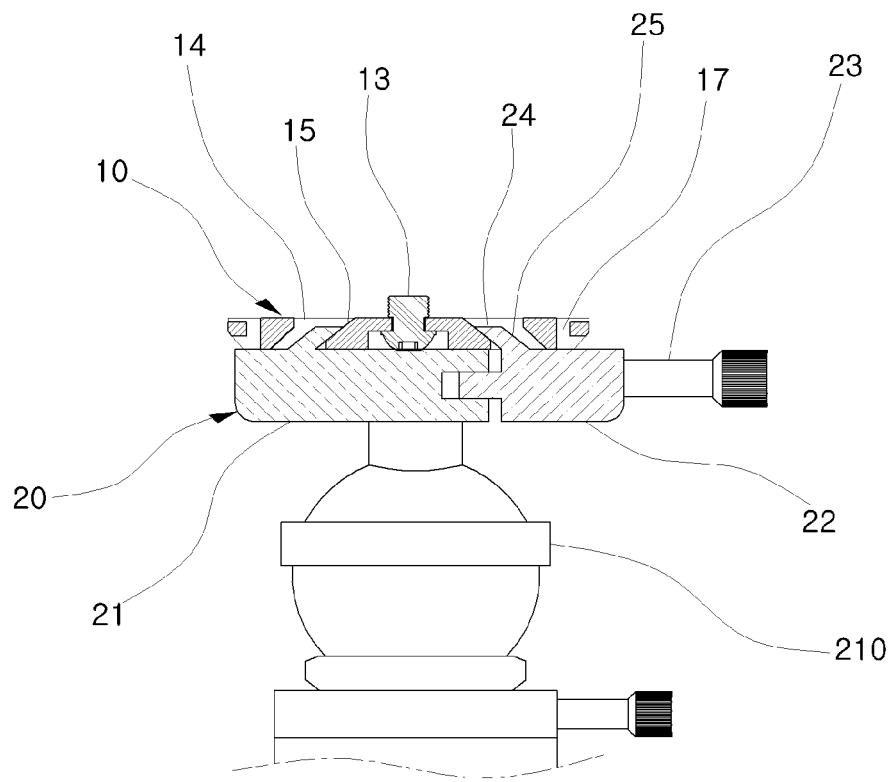
FIG. 2 is a sectional view showing the mounting state of FIG. 1.
Figure 3:
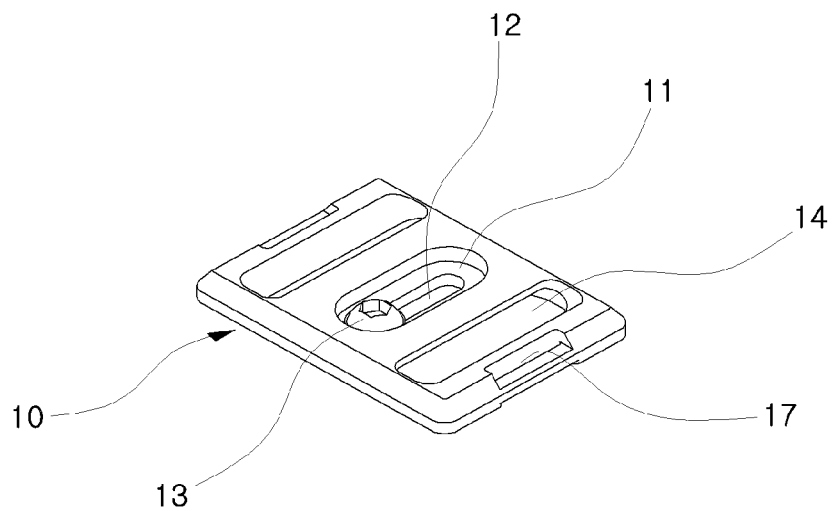
FIG. 3 is a perspective view showing a male quick shoe of the present invention.
Figure 4:
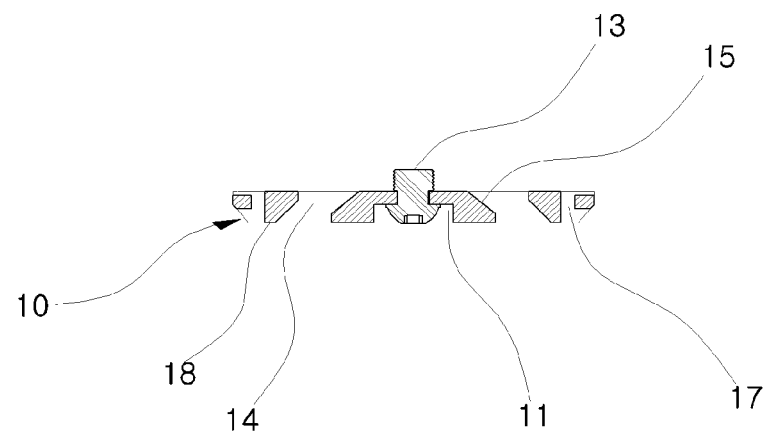
FIG. 4 is a sectional view showing the male quick shoe according to the present invention.
Figure 5:
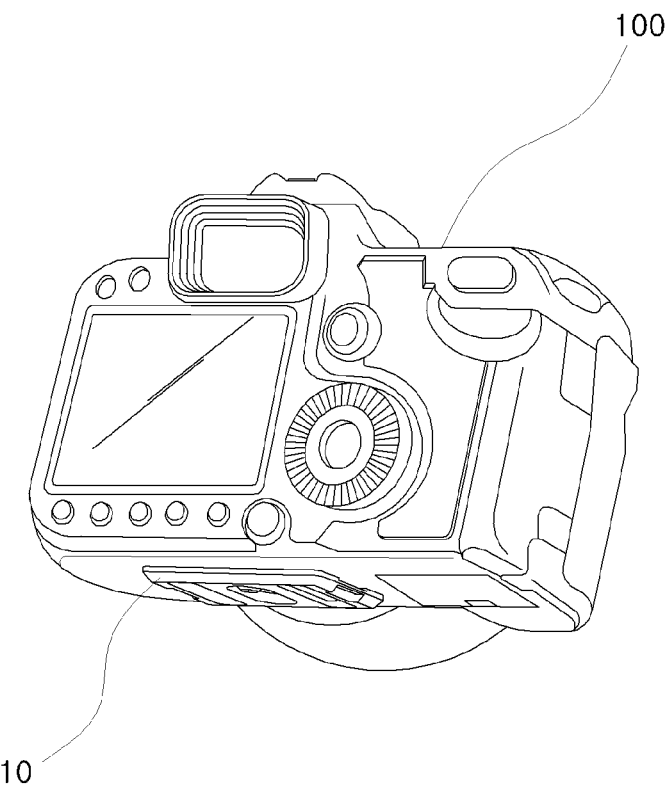
FIG. 5 is a bottom surface perspective view showing that the male quick shoe according to the present invention is mounted on the camera.
Figure 6:
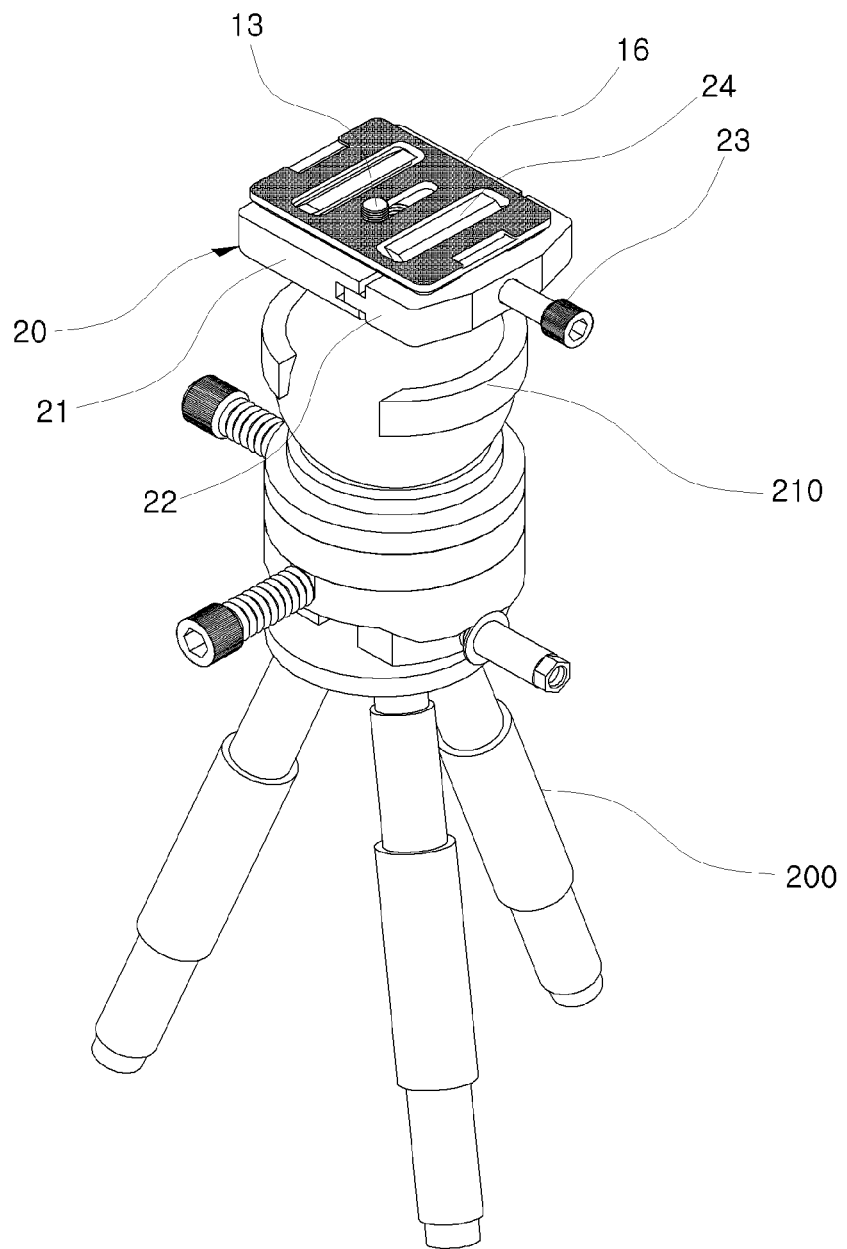
FIG. 6 is a perspective view showing a state in which the male quick shoe according to the present invention is coupled with the female quick shoe.
Figure 7:
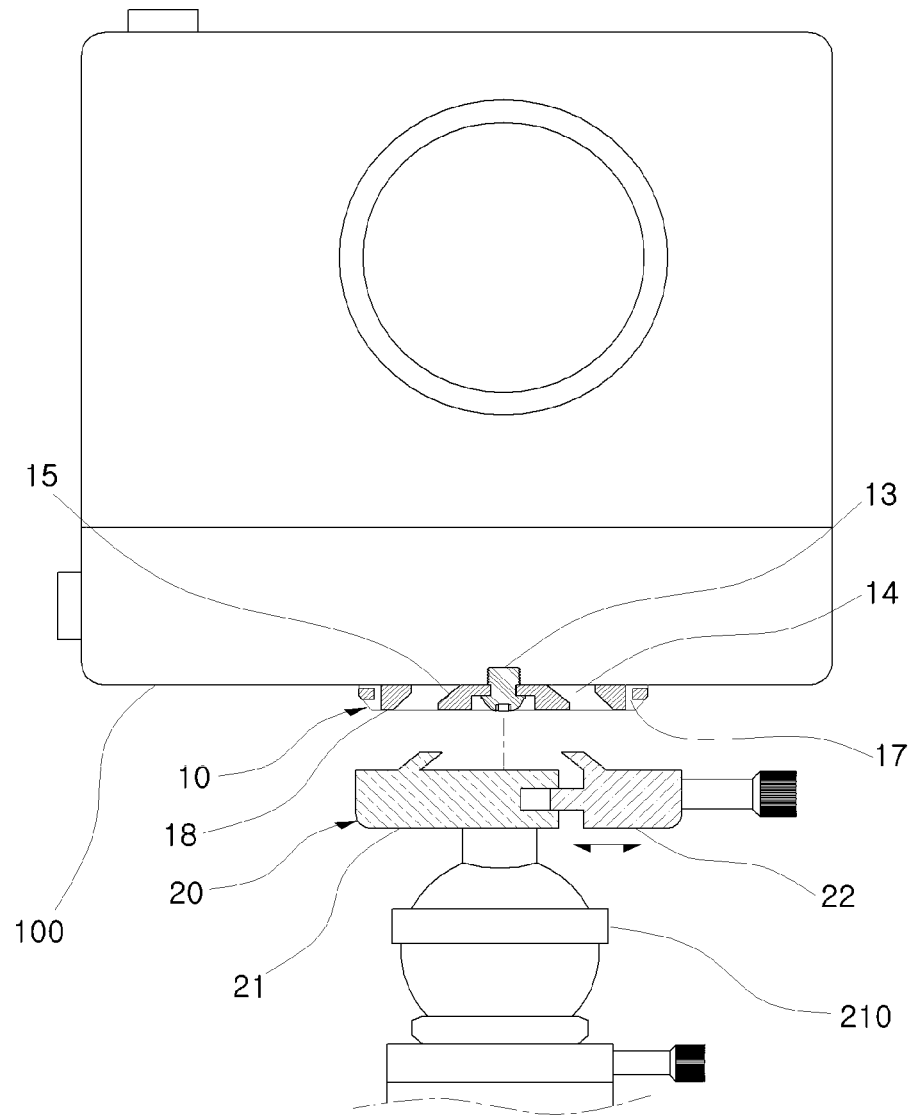
FIG. 7 is an exploded sectional view showing the mounting state of the quick shoe according to the present invention.

The present invention provides a quick shoe including a female quick shoe 20 coupled with a head of a tripod 200 to mount a camera 100 to the tripod 200, and a male quick shoe 10 coupled with a lower end of the camera 100 in such a manner that the male quick shoe 10 is received in the female quick shoe 20 and the camera 100 is detachable from the tripod 200 through one touch scheme. The male quick shoe 10 is provided at a central portion having a plate shape thereof with a recess section 11 and includes a through hole 12 formed in the recess section 11 such that a fastening unit 13 is inserted into the through hole 12 to fix the camera 100, mounting holes 14 formed at both sides of the fastening unit 13, and first inclined mount surfaces 15 formed inside the mounting hole 14 symmetrically to each other. The female quick shoe 20 is provided at an upper portion thereof with a pressing protrusion 24 having second inclined mount surfaces 25 having an angle identical to an angle of the first inclined mount surfaces 15 of the mounting hole 14. As an operating lever 21 of the female quick shoe 20 is fastened or released in a state in which the pressing protrusion 24 is fitted into the mounting hole 14, the first and second inclined mount surfaces 15 and 25 are pressed so that the male quick shoe 10 is attached to or detached from the female quick shoe 20.

Mode for Invention

Hereinafter, a preferred embodiment according to the present invention will be described with reference to accompanying drawings. In following description, the same reference numbers will be assigned to the same elements.

As shown in FIG. 1, according to the present invention, a quick shoe includes a male quick shoe 10 and a female quick shoe 20 used to mount a camera 100 onto a tripod 200. The male quick shoe 20 is fixed to a lower end of the camera 100 and the female quick shoe 20 is fixed to a head 210 of the tripod 200 so that the male quick shoe 10 is detachable from the female quick shoe 20.

The male quick shoe 10 has a plate shape, and provided at the central portion thereof with a recess section 11 and a through hole 12, and a fastening unit 13 is inserted into the through hole 12. In this state, the fastening unit 13 is screwed with a coupling hole provided at a lower end of the camera 100.

Mounting holes 14, which are recessed in the body, having a predetermined length are formed at both sides of the fastening unit 13 and fixed around pressing protrusions 24 of the female quick shoe 20 fitted onto the head 210 of the tripod 200.

The female quick shoe 20 includes a fixing plate 21 and an operating plate 22 such that the interval between the pressing protrusions 24 can be narrowed or widened as a lever operates. Inclined mount surfaces 15 and inclined mount surfaces 25 having a predetermined angle are formed in the mounting holes 14 of the male quick shoe 10 and the pressing protrusions 25, respectively, such that the inclined mount surfaces 15 are symmetric to each other, and the inclined mount surfaces 25 are symmetric to each other. In this case, as the operating plate 22 of the female quick shoe 20 slides, the male quick shoe 10 is closely fixed with the female quick shoe 20 or released from the female quick shoe 20.

As described above, the fastening unit 13 for the fixation of the camera 100 is integrated with the mounting hole 14 for the fixation of the female quick shoe 20 on the male quick shoe 10 having a plate form, so that the thickness of the make quick shoe 10 is reduced. In addition, when a user takes a picture by using a camera 100 fitted with the quick shoe 10, the quick shoe 10 does not interfere with a user's hand in shooting while maintaining the best grip feel.

After the male quick shoe 10 is primarily secured with the female quick shoe 20 through the inclined mount surfaces 15, support sections 18 formed at the outer portion of the mounting hole 14 closely makes contact with a top surface of the male quick shoe 20 so that the male quick shoe 10 is secondarily secured with the female quick shoe 20. Accordingly, the male quick shoe 10 is secured with the female quick shoe 20 twice, so that the securing force between the camera 100 and the tripod 200 is more enhanced. In addition, since the interval between the support sections 18 is wide, the male quick shoe 10 is more stably secured with the female quick shoe 20.

Meanwhile, the through hole 12 of the male quick shoe 10 has a long length. In this case, when the male quick shoe 10 is mounted on the camera 100, the male quick shoe 10 can move back and forth by a predetermined distance. Accordingly, the position of the male quick shoe 10 can be adjusted.

In addition, a contact plate 16 is provided on one surface of the male quick shoe 10 closely making contact with the camera 100. In this case, the adhesion force between the camera 100 and the male quick shoe 10 is increased to prevent the camera 100 from randomly rotating in a state in which the camera 100 is mounted on the tripod 200. The contact plate 16 includes a rubber plate having higher friction force or has a plurality of concave-convex surfaces, so that the securing force with the camera 100 can be enhanced.

In addition, side holes 17 used to fasten the male quick shoe 10 by using a string are provided at both sides of the male quick shoe 10. Accordingly, the male quick shoe 10 is linked with one side of the camera 100 or the tripod 200 through the string, so that the male quick shoe 100 can be prevented from being lost.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

INDUSTRIAL APPLICABILITY

According to the present invention, a quick shoe has a simple structure including male and female quick shoes to secure a camera with a tripod, and can be firmly secured with the tripod. The thickness of the male quick shoe is minimized to enhance a grip feel and the adhesion force between the camera and the tripod is increased, so that the shake of the camera can be minimized.

The invention claimed is:

1. A quick shoe comprising:
a female quick shoe coupled with a head of a tripod to mount a camera to the tripod; and
a male quick shoe coupled with a lower end of the camera in such a manner that the male quick shoe is received in the female quick shoe and the camera is detachable from the tripod through one touch scheme,
wherein the male quick shoe is provided at a central portion having a plate shape thereof with a recess section and includes a through hole formed in the recess section such that a fastening unit is inserted into the through hole to fix the camera, mounting holes formed at both sides of the fastening unit, and first inclined mount surfaces formed inside the mounting hole symmetrically to each other,
wherein the female quick shoe is provided at an upper portion thereof with a pressing protrusion having second inclined mount surfaces having an angle identical to an angle of the first inclined mount surfaces of the mounting hole, and
wherein, as an operating lever of the female quick shoe is fastened or released in a state in which the pressing protrusion is fitted into the mounting hole, the first and second inclined mount surfaces are pressed so that the male quick shoe is attached to or detached from the female quick shoe.

2. The quick shoe of claim 1, wherein the through hole of the male quick shoe has a long length so that the male quick shoe moves back and forth to adjust a coupling position of the camera, and a contact plate is provided on a surface of the male quick shoe closely making contact with the camera to prevent a direction of the camera from being randomly changed in a state in which the male quick shoe is firmly secured with the camera.

3. The quick shoe of claim 1, further comprising side holes provided at both sides of the male quick shoe and linked with the camera or the tripod by using a string to prevent the camera from being lost.

* * * * *